March 22, 1955
W. H. KREIDL
2,704,382
METHOD FOR PRINTING ON THE SURFACE
OF POLYETHYLENE PLASTICS
Original Filed Jan. 18, 1949
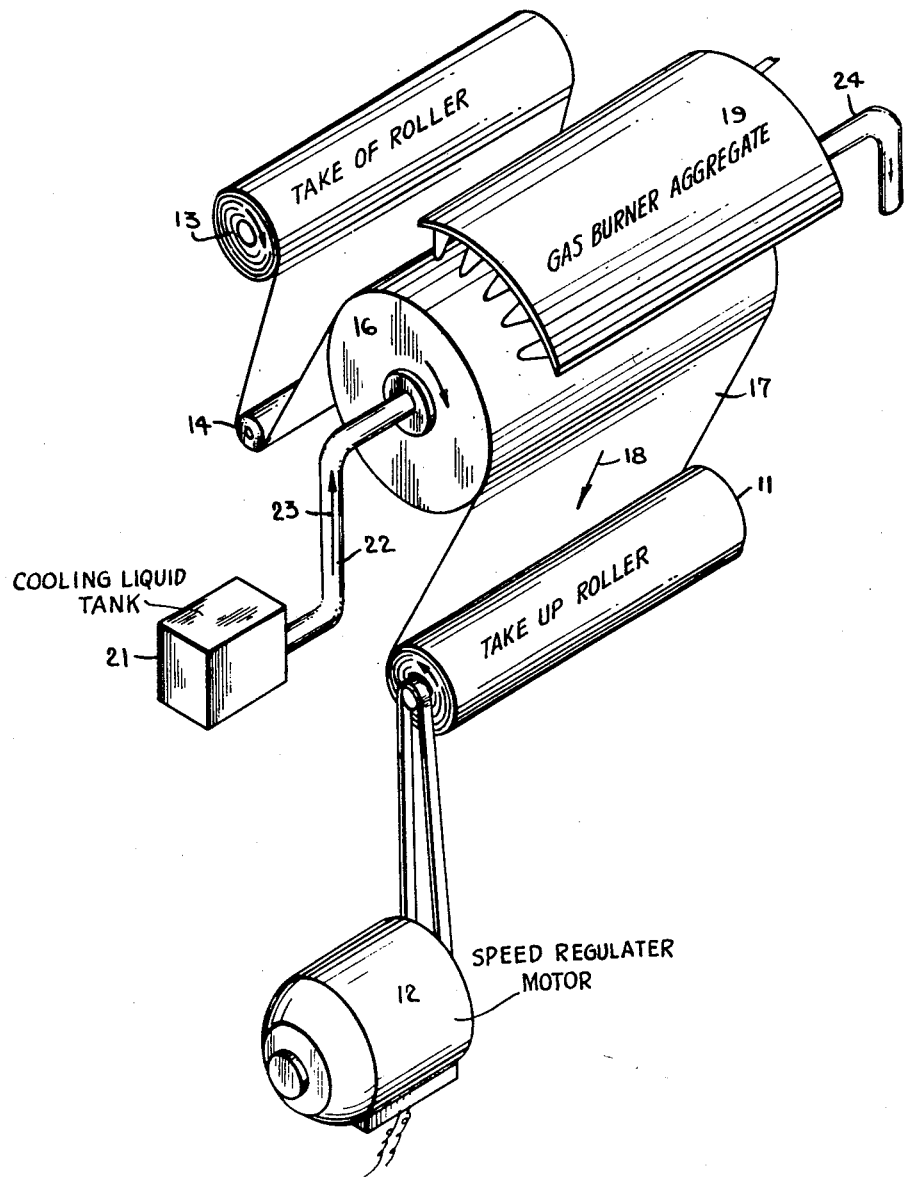
INVENTOR:
Werner H. Kreidl,
BY
Freeman & Marmorek,
His Agents.

United States Patent Office 2,704,382
Patented Mar. 22, 1955

2,704,382

METHOD FOR PRINTING ON THE SURFACE OF POLYETHYLENE PLASTICS

Werner H. Kreidl, New York, N. Y.

Original application January 18, 1949, Serial No. 71,557. Divided and this application November 5, 1952, Serial No. 318,910

12 Claims. (Cl. 18—47.5)

This invention relates to a method for improving the bonding properties of plastics, and more particularly for the printing of plastics of the polyethylene type.

This is a division of my co-pending application, Ser. No. 71,557, filed January 18, 1949, now Patent No. 2,632,921, dated March 31, 1953.

The printing of plastics of all kinds has provided many difficulties due to the inertness of the surface and for other reasons. In most cases, however, fairly satisfactory printing inks could be developed. However, in the particular case of plastics of the polyethylene type the very best printing inks thus far developed are suitable only for very thin sheets, such as not in excess of a few mils. To promote better adhesion of these inks on such thin sheets, it is customary to bake the printed article at about 100°–250° F.

It is an object of the present invention to provide methods for improving the bonding properties of such polyethylene type resins. Another object of the invention is to provide a method for bonding printing inks to such polyethylene type resins. A still further object of the invention is to improve the bonding properties of sheets or other articles made from polyethylene type resins which are thicker than about 10 mils.

The invention accordingly comprises the several steps and the relation of one or more of such steps with respect to each of the others, all as exemplified in the following detailed disclosure, and the scope of the application of which will be indicated in the claims.

The present invention is based on the discovery that the surface structure of polyethylene type resins, chemically or physically, appears to be dependent on its thermal history. While the theory is not completely understood, the following explanation of the underlying phenomena will serve to illustrate this invention and to facilitate its understanding without, however, being limited to the tentative theoretical explanations.

I have found that the bonding properties of a body of polyethylene plastics can be improved for printing ink adherence by softening or melting one surface by the application of heat to the surface layer without materially heating the rest of the body, and then permitting the surface to harden, by cooling; I have found that a slow cooling rate is particularly effective. It appears that the decreased cooling rate, as well as the peculiar temperature gradients set up through the cross section of relatively thick layers polyethylene type materials when cooled down from the molding state imparts a particularly inert surface structure to them.

Based on the principles of this invention it was, therefore, possible to develop control means to provide satisfactory and improved adhesion of printing inks and polyethylene type resins, independent of the thickness of the material to be printed or decorated. Of course, once the principles of this invention are well understood and general rules for improving adhesion are established, it will be readily apparent to those skilled in the art how to select the optimum treatment for any desired thickness of a polyethylene type resin and/or any specific commercial polyethylene type product.

The single view in the drawing is a perspective illustration of an apparatus for carrying-out the method in accordance with the invention.

Generally speaking, best results will be obtained when the surface is heated to as high a temperature as possible which, however, is still compatible with the type of resin used and which will not destroy it physically or chemically, while the underlying body is heated up as little as possible. The most simple way of obtaining this aim is to take advantage of the relatively low heat conductivity of polyethylene type resins and to subject the surface to a hot blast of air for a relatively short period of time. Of course, any equivalent method for obtaining the same thermal conditions will be equally applicable and as long as heat can be restricted to the surface it will be immaterial whether heat is obtained by convection or by radiation, whether it be infra-red or even longer wave lengths of the electromagnetic spectrum.

In this respect, probably due to the greater mobility of the molecules, the polyethylene type resins show a behavior which might be in analogy with glass in or near the annealing range. The bonding characteristics of polyethylene type resins can be markedly improved by the heat treatment according to this invention, and this beneficial treatment can be carried out before or after the actual printing.

In my aforementioned co-pending application Ser. No. 71,557, there has been claimed the method of treating polyethylene before printing. The instant application is directed to a method of treating polyethylene surfaces after they have been imprinted.

From these considerations it becomes apparent that the surface heating according to this invention and the customary baking of the entire product are two entirely different processes which create entirely different changes with respect to the physical and chemical structure of the surface of the material and, as a corollary thereof, entirely different results with respect to the bonding of the printing inks. As a matter of fact, in the case of polyethylene articles, thicker than 10 mils, no substantial improvement whatsoever will be obtained by the old baking process. This, however, does not means that the process of the present invention is not suitable for quite thin layers of polyethylene, as long as the thickness in combination with the heating method used permits the establishment of a temperature differential within the polyethylene body which will favor the phenomena underlying this invention.

With reference to resins of the polyethylene type it will be understood that this is to comprise all the various resins obtained by the polymerization of ethylene or its homologues, or such copolymers thereof whose surface characteristics are predominantly or at least noticeably determined by the polyethylene constituents thereof, as will be readily understood by those skilled in the art.

With respect to the surface temperatures necessary for activation, it is, of course, impossible to give definite limits. For any specific case those skilled in the art will be able to determine, by simple experiment, the best conditions once they have become familiar with the principles of this invention. By way of illustration, however, and as a guide for such experimentation, it can be stated that for the polyethylene materials now commercially available (having usually a molecular weight of over 20,000, and being free from any incorporated plasticizers), the surface temperature should be above 140°– 158° F., up to above the melting point, while the body of the article to be printed should be less than 140°–158° F., preferably below 122° F.

While no definite limit can be given for the thickness of the surface layer to be heated, it can be stated that this should not be in excess of about 5–10 mils. This thickness can be readily evaluated by determining the maximum thickness of the specific material up to which satisfactory adhesion can be obtained without making it absolutely necessary to take recourse to the method of the present invention.

It is, however, preferable to confine such heating to a much thinner layer, which should not be in excess of ½ mil, and which layer should be heated over 248°–266° F., preferably above the melting point of polyethylene, sufficiently high to soften or melt the surface but below temperatures at which decomposition starts. The thickness of this optimum layer can be readily regulated by determining the maximum thickness of the specific material up to which optimum adhesion can be obtained and where the use of the method of the present invention does not cause any noticeable improvement in the bonding.

The process according to the present invention may be illustrated by the following examples, without, however, being limited thereto:

*First example.*—A .030″ polyethylene sheet is transported at a speed of 70 yards per minute past a gas flame at such a distance that the surface receives a sheen, that the temperature and heat on the surface is high enough to melt compounds placed on the surface having a melting point higher than 158° F. but not as high as to melt compounds of a melting point higher than 212° F., while the reverse side to the flame does not heat up to more than 122° F. The actual temperature on the surface exposed to the flame is near 302° F. but only a layer of less than .001″ reaches this temperature or more.

As shown in the drawing, there is provided a winding roller 11 driven at constant speed from a speed-regulated electric motor 12, and unwinding roller 13, and a tensioning roller 14. Furthermore, there is provided a cooling roller 16, intermediate the winding roller 11 and the tensioning roller 14. A polyethylene sheet 17 is suspended between these rollers, and is transported thereby in direction 18 lengthwise, as the winding roller 11 unwinds the sheet 17 from the roller 13. Heating means such as a gas burner 19, is provided opposite that portion of the surface of the roller 16 that transports the sheet 17, to convey heat to one surface of the sheet 17. The opposite surface of the sheet 17 is in contact with the roller 16. A cooling liquid is transported from a tank 21 through a conduit 22 in direction 23 to the interior of the roller 16 for cooling the outer surface thereof to cool the portion of the sheet in contact therewith, and the cooling liquid is discharged from the roller in a conduit 24.

*Second example.*—A .001″ sheet is passed close to a heating element of at least 1472° F. near enough to produce a surface sheen. The reverse side is cooled with water. The surface exposed to the heat reaches 302° F. (at most to a thickness of about .002″ or less), while the reverse side is cooled to 68° F. with a water spray or a water cooled roller.

*Third example.*—A blown polyethylene bottle is passed through hot air of a temperature higher than 752° F., the amount of air being sufficient to produce a surface sheen and to heat the surface to about 302° F. and to heat a surface layer of not more than about .008″ to 212° F. while the reverse side does not reach the temperature above 122°–158° F. The inside of the bottle preferably is cooled by a stream of cold air.

*Fourth example.*—An extruded polyethylene article thicker than about .03″ is being transported rapidly through a hot oven of enough heating capacity to heat the surface layer (up to .01″ preferably not more than .001″) to 212°–302° F. but the bulk of the article to not more than 122° F. and then is cooled rapidly.

The surface is cooled, to harden, after the temporary heating operation.

Any ink suitable for printing on polyethylene is suitable for this purpose. An example for such an ink is:

18% plasticized vinyl resin
10% titanium oxide
20% medium boiling hydrocarbons aromatic
52% low and medium boiling ketones To prepare both sides of a sheet for better printing it usually will be preferable, and in case of thin gauges, necessary, to subject one side after the other to a heat treatment of this invention.

This procedure can advantageously be used in the manufacture of extruded sheets or blown articles. For example, in the production of sheets, the one side of the sheet after leaving the calender could be heated by the above means or could be left just exposed to as little cooling air as possible, while the other side could be quenched, for example, by means of a water cooled roller.

While, due to the great importance of this problem, this invention is particularly described with respect to the improvement of polyethylene resins with respect to their bonding with printing inks, it is by no means restricted thereto. This invention is equally applicable, and for the same reasons, where the bonding properties of the surface are to be improved for any other material, such as especially adhesives of all kinds, such as vinyl adhesives, or adhesives made from vinyl homologues or derivatives, or vinyl copolymers, but also for rubber adhesives, both natural and synthetic, and so on. Generally, this invention will be applicable in all cases where substances show bonding properties with polyethylene type resins and show the same phenomenon of inherent bonding thickness as illustrated with the polyethylene printing inks.

What I claim is:

1. In a method of printing on a surface of a body of polyethylene materials which comprises subjecting said body to a differential heat treatment whereby the printing surface is subjected to an elevated temperature sufficient to improve its bonding properties but not in excess of temperatures compatible with the stability of the polyethylene resin, while material adjoining the said surface layer is held at temperatures below the minimum temperature effective for the said surface treatment, printing the said resin prior to the said heat treatment process.

2. In a method of printing on a surface of a body of polyethylene resins which comprises subjecting the surface layer of said body to a temperature above about 140° F., while material adjoining the said surface layer is being held below about 122° F., printing on the said surface prior to the said heat treatment process.

3. In a method of securing decorative matter to a surface of a polyethylene body, the steps comprising, first applying the decorative matter to said surface, subsequently softening said surface by the application of heat thereto without materially heating the rest of said body, and thereafter permitting said surface to harden.

4. In a method of securing decorative matter to a surface of a polyethylene body, the steps comprising, first applying the decorative matter to said surface, subsequently melting said surface by the application of heat thereto, and thereafter permitting said surface to harden.

5. In a method of securing decorative matter to a surface of a polyethylene body, the steps comprising, first applying the decorative matter to said surface, subsequently melting said surface by the application of heat by direct flame action thereto, and thereafter permitting said surface to harden.

6. In a method of securing decorative matter to a surface of a polyethylene body, the steps comprising, first applying the decorative matter to said surface, subsequently softening said surface by the application of heat thereto while simultaneously maintaining the rest of the body at a temperature sufficiently low to restrain softening, and thereafter permitting said surface to harden.

7. In a method of securing decorative matter to a surface of a polyethylene body, the steps comprising, first applying the decorative matter to said surface, subsequently subjecting said body to a differential heat treatment whereby said surface will be softened without any material heating of the rest of said body, and thereafter cooling said surface.

8. In a method of printing on a surface of a polyethylene body, the steps comprising, first printing on said surface, subsequently softening said surface by the application of heat thereto without materially heating the rest of said body, and thereafter permitting said surface to cool below hardening temperature.

9. In a method of printing on a surface of a polyethylene body, the steps comprising, first printing on said surface, subsequently subjecting said body to a differential temperature treatment whereby said surface will be softened without the rest of said body being heated materially, and thereafter permitting said surface to cool below hardening temperature.

10. In a method of printing on a surface of a polyethylene body, the steps comprising, first printing on said surface, subsequently heating the layer of said surface to a temperature above about 140° F. and simultaneously maintaining the rest of said body at a temperature below about 122° F., and thereafter permitting said surface to cool.

11. In a method of printing on a surface of a polyethylene body, the steps comprising, first printing on said surface, subsequently heating the layer of said surface to a temperature above about 140° F. and simultaneously maintaining the rest of said body at a temperature below about 122° F., and thereafter quenching said surface.

12. In a method of printing on a surface of a polyethylene body, the steps comprising, first printing on said surface, subsequently heating the layer of said surface to a temperature above about 140° F. and simultaneously maintaining the rest of said body at a temperature below about 122° F., and thereafter rapidly cooling said surface to a temperature below the effective heat treatment temperature.

References Cited in the file of this patent

UNITED STATES PATENTS

| | | |
|---|---|---|
| 2,526,634 | Chavannes | Oct. 24, 1950 |
| 2,551,005 | Johnson | May 1, 1951 |